Dec. 29, 1964  J. L. PORTER ETAL  3,163,523
METHOD OF PURIFYING GERMANIUM
Filed June 27, 1962
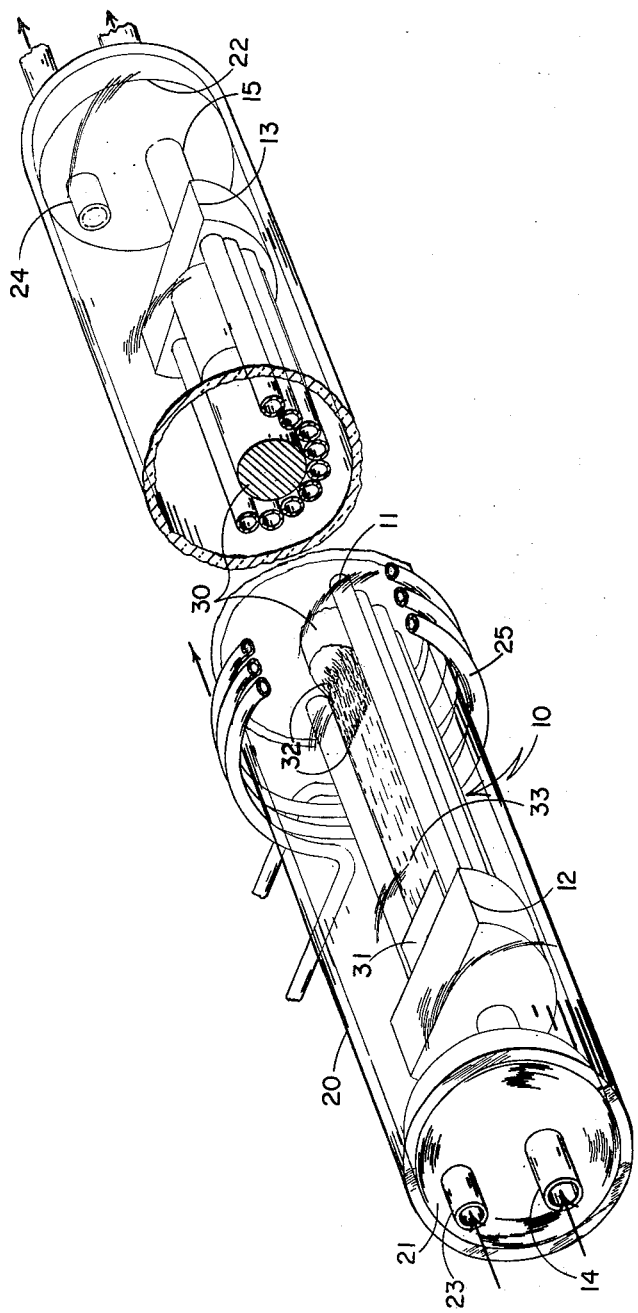
INVENTORS.
JOHN L. PORTER
and JOHN D. SCIOLA
BY David M Keay
AGENT.

United States Patent Office 3,163,523
Patented Dec. 29, 1964

3,163,523
METHOD OF PURIFYING GERMANIUM
John L. Porter, Lynn, and John D. Sciola, Beverly, Mass., assignors to Sylvania Electric Products Inc., a corporation of Delaware
Filed June 27, 1962, Ser. No. 205,699
4 Claims. (Cl. 75—84)

This invention relates to methods of purifying germanium. More particularly, it is concerned with methods of producing purified germanium in ingot form from scrap germanium in admixture with contaminants associated with the scrap as a result of operations from which the scrap was derived.

In the production of electrical devices of semiconductive germanium extremely small germanium bodies or dice are obtained from large blocks or ingots of purified germanium. The ingots of germanium are of single crystal structure and frequently contain conductivity type imparting materials which have been introduced into the ingot in precisely controlled amounts. In the process of dividing an ingot into individual germanium dice, the ingot is usually sliced into thin wafers from which dice are subsequently obtained. The ingots are sliced in a sawing apparatus utilizing diamond-dressed cutting wheels. In the process of slicing an entire ingot into thin wafers a large amount of the germanium from the ingot is converted to sawdust.

Since germanium is a relatively expensive material and since a large proportion of the germanium in an ingot is reduced to sawdust, the sawdust is recovered and reprocessed. Germanium sawdust is removed from the sawing apparatus in the form of a sludge which includes germanium particles and various contaminants from the mounting blocks and adhesives supporting the ingot during the slicing operation, from the liquid cutting coolant, and from the atmosphere. The recovered sludge commonly is completely chemically reprocessed in order to provide purified, solidified germanium metal. Normally this involves the steps of conversion of the germanium in the sludge to germanium tetrachloride, purification of the chloride, hydrolysis of the chloride to germanium dioxide, reduction of the dioxide to germanium, and the well-known zone purification of the germanium so produced. This procedure is equivalent to that employed with raw germanium ore, and fails to utilize the advantage that the scrap germanium although heavily contaminated, is already in the form of an elemental metal.

Under certain circumstances it has been possible to reclaim germanium from the germanium sludge recovered from the sawing apparatus by melting it down in a high temperature furnace to form a solid mass. The material thus obtained may then be subjected to several zone melting treatments in order to improve its purity and permit its use in germanium semiconductor devices. However, it frequently occurs that the germanium sludge will not melt down and then solidify into a continuous mass. For example, when a germanium ingot is sliced by a high speed annular saw of the type which has its cutting edge at its inner periphery, the sawdust particles are of extremely small size. These small particles have a large surface-to-volume ratio and, therefore, a high proportion of contaminants adhering to the surface. It has been found particularly difficult to melt down sludge obtained from this type of sawing apparatus and obtain a solid continuous body amenable to purification by zone melting.

It is an object of the present invention, therefore, to provide an improved method of purifying germanium.

It is a more specific object of the present invention to provide an improved method of producing purified germanium in ingot form from particles of contaminated germanium recovered as sawdust.

Briefly, in accordance with the foregoing objects of the invention a fluxing or cleaning agent is incorporated with particles of contaminated germanium and then the combined materials are zone melted. A solid ingot of germanium relatively free of contaminants and suitable for further purification by additional zone melting is thus obtained.

Various materials may be employed as fluxing agents in the process described herein, depending on the particular nature of the contaminants associated with the scrap germanium. In general, alkali metal hydroxides and the alkali metal salts of weak acids are particularly effective. As will be apparent from the examples of the process hereinafter set forth, the alkali metal salts of carbonic acid appear to afford the best results, particularly from the standpoint of high recovery yield.

Additional objects, features, and advantages of the method of purifying germanium according to the foregoing invention will be apparent from the following detailed discussion and the accompanying drawing in which the single figure is a fragmentary perspective view of apparatus for zone melting germanium undergoing processing according to the method of the invention.

Germanium to be purified and formed into a solid mass is recovered from sawing apparatus in the form of a sludge comprising sawdust particles of germanium metal in cooling liquid such as, for example, water and also various contaminants including, for example, oxides on the surfaces of the particles, carbon, grit, adhesives, and other foreign matter picked from the atmosphere and from the tools and fixtures with which the germanium has been machined or associated. A cleaning or fluxing agent is incorporated with the contaminated germanium particles and the resulting material is placed in an elongated vessel or container for zone melting.

An apparatus for zone melting the combined germanium and fluxing agent is illustrated in the figure of the drawing. The apparatus shown includes a vessel or container 10 constructed of a plurality of hollow metal tubes 11 arranged side by side to form a trough. The ends of the tubes are connected to manifolds 12 and 13. An inlet tube 14 for liquid coolant opens into the chamber of one manifold 12 and an outlet tube 15 for the coolant opens into the chamber of the other manifold 13.

A cylindrical tube 20 of fused clear quartz encircles the container. Plugs 21 and 22 form seals around the inlet and outlet tubes and seal the openings at the ends of the quartz tube. The container is thus supported within the quartz tube. A gas inlet 23 to the furnace chamber formed by the quartz tube is provided in the first plug 21 and a gas outlet 24 is provided in the second plug 22. An induction heating coil 25 encircles the container and quartz tube. The coil is energized by a source of radio frequency energy (not shown). Movement of the coil along the length of the container or movement of the container through the coil is obtained by a driving means (not shown). Additional details of zone melting apparatus of the type illustrated herein are disclosed in application Serial No. 771,805, filed November 14, 1958, now abandoned, entitled "Method of Zone Melting Semiconductor Materials," in the names of R. J. O'Neil, J. L. Porter, and R. C. Tonner and assigned to the assignee of the present invention.

The contaminated germanium particles and the fluxing agent are first mixed, and the mixture is placed along the length of the container 10. It has been found that the purification process herein disclosed is accomplished particularly effectively by insuring intimate association of the sludge and the fluxing agent. For example, the sludge and fluxing agent may be dried and then compressed into cylindrical pellets 30 of convenient size for the subsequent zone melting operation. The pelleting of the mixture also promotes proximity of the discrete germanium particles and thus simplifies melting.

A carbon block 31 is positioned adjacent the mixture or a first pellet of the mixture at one end of the container. The induction coil 25 is positioned encircling the carbon block 31 and the portion of the mixture adjacent the end of the container. A non-oxidizing atmosphere is provided in the furnace chamber by the continuous flow of an inert or reducing gas such as, for example, argon, helium, hydrogen, or mixtures of such gases from the inlet 23 to the outlet 24.

Radio frequency energy is then applied to the induction coil 25. Electrical currents induced in the carbon block 31 heat it to incandescence thereby heating the adjacent portion of the germanium-flux mixture. As the temperature of the mixture is raised, the radio frequency energy couples to it thus heating the germanium directly and causing the portion of the mixture encircled by the coil to melt. As is well understood in the art of zone melting as explained, for example, in Pfann, W. G., Zone Melting, John Wiley & Sons, Inc., 1958, the molten zone is caused to travel along the length of the material in the container. This action is accomplished either by moving the induction coil along the length of the container, or alternatively by moving the container along its length through the induction coil. In either case the molten zone 32 established in the material is caused to traverse the length of the material in the container progressively melting the material at one interface of the molten zone and progressively freezing material of the zone at the other interface of the zone to form solidified material 33.

Upon completion of the zone melting procedure the germanium particles have formed into a solid ingot of germanium metal. The water-cooled metal container has not been attacked by either the fluxing agent or the molten germanium, and thus the ingot does not adhere to the container nor is it contaminated by it. The exterior of the ingot particularly the upper surface is covered with a deposit comprised primarily of the accumulated contaminants removed from the germanium particles by the cleaning agent.

After the ingot has been taken from the container, the deposit is removed from the surface of the ingot as by wire brushing. The surface is then further cleaned chemically. The contaminants which are insoluble in germanium are thus eliminated. Those materials which are soluble in germanium, such as the commonly used conductivity type imparting materials, are most heavily concentrated in the end portion of the ingot which was last to be melted in accordance with the known phenomenon of zone melting. The ingot may be further refined by repeating the zone melting process in order to increase the concentration of soluble materials at the end of the ingot and improve the purity of the remainder of the ingot.

The following examples are given in order to illustrate the method of the present invention.

*Example 1*

Six-hundred and fifteen grams of sodium bicarbonate was added to 3,000 grams of germanium sludge containing about 80% by weight of germanium sawdust particles of from 1.5 to 5.5 microns in size. The sodium bicarbonate was thoroughly mixed with the contaminated germanium particles in a ball mill. The resulting mixture then was dried in a furnace. The dried mixture was compacted into pellets approximately 1 inch in diameter by 2 inches long under a pressure of approximately 5,000 pounds per square inch.

Ten pellets totaling approximately 1,100 grams were placed in an elongated container 10 of the type illustrated in the drawing. The container was constructed of parallel lengths of copper tubing 11 and employed water as the liquid coolant flowing through the tubing. The inside of the container was first lined with asbestos cloth, and the pellets placed on the cloth extended along the length of the container. A carbon block 31 was placed adjacent the end pellet.

The container was then placed in the quartz furnace tube 20, the ends of the tube were sealed, and the induction heating coil 25 was positioned encircling the carbon block and the end portion of the adjacent pellet. Hydrogen was introduced into the furnace at the inlet 23 and exhausted at the outlet 24. Electrical energy was supplied to the induction coil 25 causing the carbon block 31 and subsequently the end portion of the adjacent pellet to heat. Once a molten zone was established in the germanium pellet, the zone was caused to move along the length of the material in the container by movement of the coil relative to the container at a rate of ⅓ inch per minute. The molten zone was maintained approximately 4 inches long.

The germanium particles in the pellets melted in the zone of heat created by the induction coil, and upon cooling solidified to form a solid continuous mass of germanium metal. The heat transmitted from each pellet to the next enabled the radio frequency energy from the coil to couple to each of the pellets in turn. As the molten particles solidified the pellets were fused into a continuous ingot of germanium.

Upon completion of the zone melting procedure the ingot was removed from the container for cleaning. A deposited layer on the surface of the ingot was first removed by wire brushing. This layer was made up of the insoluble products of reaction of the fluxing agent and the contaminants associated with the germanium particles. Soluble impurities such as elements which are employed to impart conductivity to germanium were swept toward the end of the ingot which was the last to be melted in accordance with the known phenomenon of zone melting. Low boiling and thermally decomposable impurities were volatilized by the heat of the molten germanium and carried away by the gases flowing through the furnace. The hydrogen also served to chemically reduce some of the contaminants, thus enabling them to be more readily removed from their association with the germanium.

The ingot of germanium was also given a chemical cleaning after being broken into sections approximately 5 to 6 inches in length. The sections were soaked in concentrated hydrochloric acid for approximately 3 to 4 hours. The sections were then boiled in water and rinsed to remove all trace of foreign matter.

The sections of the purified ingot of germanium had a weight in excess of 95% of that of the germanium particles originally present in the sludge. The resistivity of the germanium metal varied along the length of the ingot from about .5 to about 1 ohm-centimeter. Germanium which had been processed according to the foregoing example was subjected to two additional zone melting treatments. The germanium in the half of the ingot which was first to be melted was thus purified to a resistivity of about 40 ohms-centimeters. Germanium of this resistivity is considered as having intrinsic conductivity; that is, the material is substantially pure germanium.

*Example 2*

Germanium sludge similar to that employed in Example 1 was mixed with an amount of sodium acetate equal to 17% by weight of the mixture. The mixture was dried, formed into pellets, and placed in a water-cooled container as in Example 1. The material was zone melted in a hydrogen atmosphere, and the surface of the resulting ingot was cleaned of foreign matter. The ingot weighed approximately 80% of the weight of germanium particles in the sludge treated. The ingot was more porous than the ingot obtained in Example 1, and required more zone melting treatments than the material in Example 1 to raise the resistivity of the material to the same value.

Example 3

Sodium sulphate was mixed with the germanium sludge in the amount of 17% by weight of the resulting mixture. The mixture was dried, compacted into pellets, and placed in a water-cooled metal container as in Example 1. The pellets were then zone melted in a hydrogen atmosphere, and the resulting ingot was cleaned of foreign matter. The ingot was approximately 60% by weight of the germanium particles in the sludge treated.

Example 4

A mixture of sodium hydroxide and germanium sludge was prepared with the sodium hydroxide present in the amount of approximately 20% by weight. The mixture was dried, made into pellets, zone melted in a hydrogen atmosphere, and the exterior of the resulting ingot was cleaned. About 50% of the germanium metal in the sludge was recovered in the ingot.

Example 5

Germanium sludge was mixed with an amount of potassium carbonate equal to approximately 20% by weight of the mixture. The mixture was dried, formed into pellets, and placed in a water-cooled metal container as in Example 1. The material was zone melted in a hydrogen atmosphere, and the surface of the resulting ingot was cleaned of foreign matter. The ingot was slightly more than 95% by weight of the germanium particles in the sludge treated.

Example 6

Sodium carbonate was mixed with germanium sludge in the amount of 17% by weight of the resulting mixture. The mixture was dried, compacted into pellets, and placed in a water-cooled metal container as in Example 1. The pellets were then zone melted in a hydrogen atmosphere, and the resulting ingot was cleaned of foreign matter. The ingot was more than 95% by weight of the germanium particles in the sludge treated.

What is claimed is:

1. The method of producing a body of purified germanium from particles of germanium intermixed with contaminants including the steps of thoroughly mixing the contaminated germanium particles and a fluxing material selected from the group consisting of the alkali metal hydroxides and the alkali metal salts of weak acids, compacting the mixture into pellets, placing the pellets in an elongated container, melting a zone of said pellets and moving the molten zone throughout the pellets along the length of the container in a non-oxidizing atmosphere to provide a continuous ingot of germanium and an adjacent layer of material comprising the insoluble product of reaction of the fluxing material and contaminants, and thereafter removing said layer from the ingot.

2. The method of producing a body of purified germanium from a sludge containing particles of germanium intermixed with contaminants including the steps of thoroughly mixing the sludge and a fluxing material selected from the group consisting of the alkali metal hydroxides and the alkali metal salts of weak acids, drying the mixture, compacting the dried mixture into pellets, placing the pellets in an elongated liquid-cooled metal container, melting a zone of said pellets and moving the molten zone throughout the pellets along the length of the container in a hydrogen atmosphere to provide an ingot of germanium and an adjacent layer of material comprising the insoluble product of reaction of the fluxing material and the contaminants, and thereafter removing said layer from the ingot.

3. The method of producing a body of purified germanium from a sludge containing particles of germanium intermixed with contaminants including the steps of thoroughly mixing the sludge and an alkali metal salt of carbonic acid, drying the mixture, compacting the dried mixture into pellets, placing the pellets in an elongated liquid-cooled metal container, melting a zone of said pellets and moving the molten zone throughout the pellets along the length of the container in a hydrogen atmosphere to provide an ingot of germanium and an adjacent layer of material comprising the insoluble product of reaction of the alkali metal salt of carbonic acid and the contaminants, and thereafter removing said layer from the ingot.

4. The method of claim 3 in which said alkali metal salt of carbonic acid is sodium bicarbonate.

References Cited in the file of this patent

UNITED STATES PATENTS

| | | |
|---|---|---|
| 2,875,108 | Pfann | Feb. 24, 1959 |
| 3,039,194 | Emeis | Apr. 17, 1962 |
| 3,047,380 | Bloem | July 31, 1962 |